(12) United States Patent
Popovich

(10) Patent No.: US 6,661,495 B1
(45) Date of Patent: Dec. 9, 2003

(54) PANCAKE WINDOW DISPLAY SYSTEM EMPLOYING ONE OR MORE SWITCHABLE HOLOGRAPHIC OPTICAL ELEMENTS

(75) Inventor: Milan M. Popovich, Leicester (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/366,449

(22) Filed: Aug. 3, 1999

Related U.S. Application Data

(63) Continuation-in-part of application No. 09/275,174, filed on Mar. 24, 1999, now abandoned.
(60) Provisional application No. 60/094,522, filed on Jul. 29, 1998.

(30) Foreign Application Priority Data

Jul. 7, 1999  (WO) .................. PCT/US99/15392

(51) Int. Cl.[7] .................. G02F 1/13; G02F 1/1335; G03H 1/00
(52) U.S. Cl. ................. 349/193; 349/1; 349/9; 349/17; 359/1
(58) Field of Search ............... 349/9, 89, 17, 349/193; 359/1, 13

(56) References Cited

U.S. PATENT DOCUMENTS

| | | | |
|---|---|---|---|
| 3,807,829 A | 4/1974 | Close | 359/28 |
| 3,940,203 A | 2/1976 | La Russa | 359/15 |
| 4,458,981 A | 7/1984 | Huignard | 359/26 |
| 4,500,163 A | 2/1985 | Burns et al. | 359/15 |
| 4,566,031 A | 1/1986 | Kirk | 359/296 |
| 4,669,812 A | 6/1987 | Hoebing | 359/20 |
| 4,759,596 A | 7/1988 | Po et al. | 359/131 |
| 4,790,613 A | 12/1988 | Moss | 359/32 |
| 4,799,739 A | 1/1989 | Newswanger | 359/15 |
| 4,807,951 A | 2/1989 | Moss | 359/32 |
| 4,830,441 A | 5/1989 | Chang | 359/15 |
| 4,834,473 A | 5/1989 | Keyes, IV et al. | 359/1 |
| 4,834,476 A | 5/1989 | Benton | 359/32 |
| H738 H | 2/1990 | McManus et al. | 349/17 |
| 4,932,731 A | 6/1990 | Suzuki et al. | 359/13 |
| 4,981,332 A | 1/1991 | Smith et al. | 359/13 |
| 4,993,790 A | 2/1991 | Vick | 359/20 |
| 5,011,244 A | 4/1991 | Smith et al. | 359/22 |
| 5,014,709 A | 5/1991 | Bjelkhagen et al. | 359/10 |
| 5,024,494 A | 6/1991 | Williams et al. | 353/42 |
| 5,035,474 A | 7/1991 | Moss | 359/13 |
| 5,036,385 A | 7/1991 | Eichenlaub et al. | 348/59 |
| 5,044,709 A | 9/1991 | Smith et al. | 359/13 |
| 5,071,209 A | 12/1991 | Chang | 359/19 |
| 5,093,563 A | 3/1992 | Small et al. | 250/334 |
| 5,103,323 A | 4/1992 | Magarinos | 501/1 |
| 5,111,313 A | 5/1992 | Shires | 359/17 |
| 5,151,724 A | 9/1992 | Kikinis | |
| 5,153,670 A | 10/1992 | Jannson et al. | |

(List continued on next page.)

FOREIGN PATENT DOCUMENTS

| | | |
|---|---|---|
| WO | 97/35223 | 9/1997 |
| WO | 98/04650 | 2/1998 |

*Primary Examiner*—Tarifur R. Chowdhury
*Assistant Examiner*—Dung Nguyen
(74) *Attorney, Agent, or Firm*—Campbell Stephenson Ascolese LLP

(57) ABSTRACT

An optical system including one or more switchable holographic optical elements is described for use with a pancake window display system. Each of the switchable holographic optical elements of the optical system operates between active and inactive states in accordance with control signals provided by a control logic circuit. In the active state, each switchable holographic optical element operates to reflect and collimate a narrow band of incident light thereon. In the inactive state, the switchable holographic optical element operates to transmit a substantial portion of light thereon without substantial alteration.

15 Claims, 18 Drawing Sheets

U.S. PATENT DOCUMENTS

| | | |
|---|---|---|
| 5,221,957 A | 6/1993 | Jannson et al. |
| 5,227,898 A | 7/1993 | Iavecchia et al. |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,418,631 A | 5/1995 | Tedesco et al. |
| 5,424,866 A | 6/1995 | Kikinis |
| 5,440,428 A | 8/1995 | Hegg et al. |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,581,378 A | 12/1996 | Kulick |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. |
| 5,744,267 A | 4/1998 | Meerholz et al. |
| 5,745,203 A | 4/1998 | Valliath et al. |
| 5,748,828 A | 5/1998 | Steiner et al. |
| 5,751,243 A | 5/1998 | Turpin |
| 5,757,522 A | 5/1998 | Kulick et al. |
| 5,760,933 A | 6/1998 | Aritake et al. |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Louiseaux et al. |
| 5,790,284 A | 8/1998 | Taniguchi et al. |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,759 A | 9/1998 | Okamori et al. |
| 5,815,222 A | 9/1998 | Matsuda et al. |
| 5,822,029 A | 10/1998 | Davis et al. |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,942,157 A | 8/1999 | Sutherland et al. |

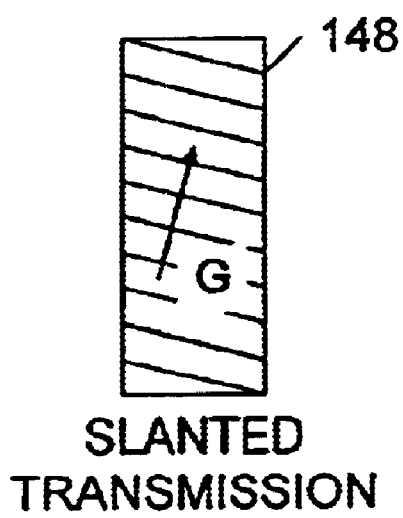
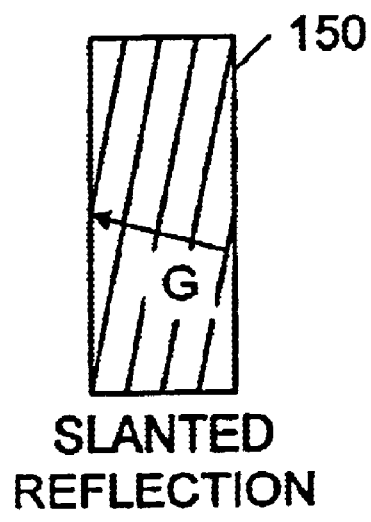
SLANTED TRANSMISSION
FIG. 11a
SLANTED REFLECTION
FIG. 11b
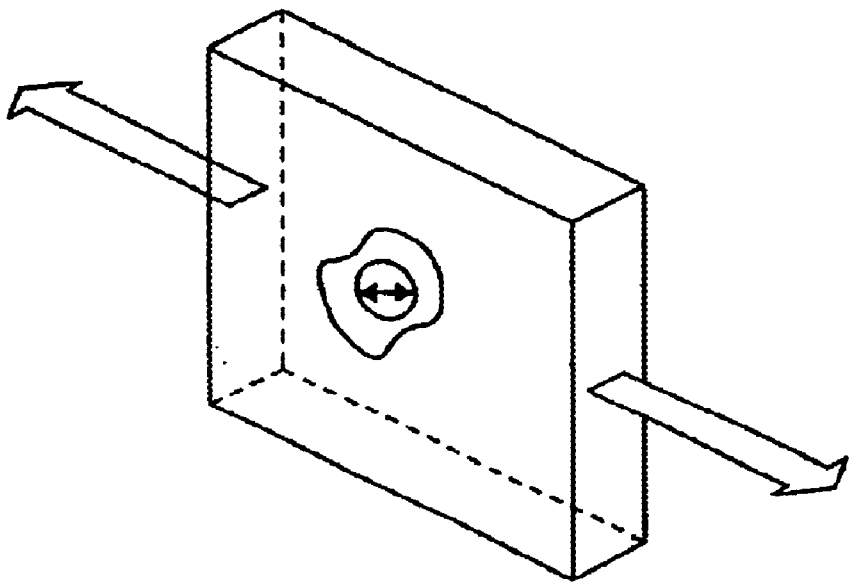
FIG. 12

LIGHT TRANSMITTED

LIGHT BLOCKED

TRANSMITTED

RETRO-REFLECTED

UNSWITCHED STATE

SWITCHED STATE

PANCAKE WINDOW DISPLAY SYSTEM EMPLOYING ONE OR MORE SWITCHABLE HOLOGRAPHIC OPTICAL ELEMENTS

RELATED APPLICATIONS

This application is a continuation-in-part of U.S. application Ser. No. 09/275,174 filed on Mar. 24, 1999 now abandoned.

This application claims priority to provisional application entitled IMPROVEMENTS TO PANCAKE WINDOW DISPLAYS, Serial No. 60/094,522, filed Jul. 29, 1998.

BACKGROUND OF THE INVENTION

1. Field of the Invention

The present invention generally relates to an image forming apparatus, and more particularly to a pancake window display system employing one or more switchable holographic elements.

2. Description of the Relevant Art

Pancake window display systems (often times referred to as in-line infinity display systems) are capable of forming images at or closer than infinity of an object or a plurality of optically superimposed objects. Pancake window display systems find application in aircraft simulators, spacecraft simulators, or in head mounted displays for use in, for example, virtual imaging. Pancake window display systems, so called because of their minimal depth, represent a major achievement in terms of simultaneously maximizing field of view, eye relief, and image quality in a compact and lightweight configuration.

FIG. 18 shows one embodiment of a prior art pancake window display system 310 that includes a first linear polarizer 312, a curved, spherical beam splitting mirror 314, a first quarter wave plate 316, a beam splitting mirror 318, a second quarter wave plate 320, and a second linear polarizer 322. In operation, first linear polarizer 312 imposes linear polarization on light from a source (not shown in FIG. 18) passing therethrough. The direction of the polarization of first linear polarizer 312 is represented by vertical arrow 324. Linearly polarized light encounters first quarter wave plate 316 after being transmitted through partially transmitting, spherical beam splitting mirror 314. The first quarter wave plate imparts a circular polarization to light passing therethrough. Right curved arrow 326 shows that light emerging from first quarter wave plate 316 is right circularly polarized. This right circularly polarized light next encounters partially transmitting, partially reflecting beam splitting mirror 318, a fraction of which passes therethough to encounter second quarter wave plate 320. Second quarter wave plate 320 acts to change the write circularly polarized light transmitted through mirror 318 back to linearly polarized light having a direction of polarization oriented at 90° to the direction of polarization 324 of the first linear polarizer 312. This is indicated in FIG. 18 by horizontal arrow 330. The linear polarized light emitted from second quarter wave plate 320 is blocked at second linear polarizer 322 which has a direction of polarization parallel to that of first linear polarizer 312.

The fraction of right circularly polarized light from first quarter wave plate 316 which is reflected at beam splitting mirror 318 is converted by such reflection into circularly polarized light of the opposite rotation, i.e., into left circularly polarized light in the case assumed. This is indicated in FIG. 18 by left curved arrow 332. In its reflective passage back towards first linear polarizer 312, this left circularly polarized light again encounters first quarter wave plate 316 which transforms the left circularly polarized light into linearly polarized light with a direction of polarization perpendicular with respect to the direction of polarization provided by first linear polarizer 312 as represented by horizontal arrow 334. A portion of this linearly polarized light is reflected and collimated by spherical beam splitting mirror 314 without change in the orientation of its polarization direction. The light so reflected and collimated becomes left circularly polarized after passing through first quarter wave plate 316 as indicated by left curve arrow 336. A fraction of this light is then transmitted through beam splitting mirror 318 and converted by second quarter wave plate 320 into linearly polarized light having a polarization direction parallel to the polarization direction of the first linear polarizer as indicated by arrow 340. This light, accordingly, is permitted to pass through second linear polarizer 322 and constitutes only a fraction of the unpolarized light from the image source (not shown in FIG. 18) that is visible to an observer 342.

The arrangement of the pancake window display system 310 shown in FIG. 18 obviates the use of an oblique beam splitting mirror across the axis of the spherical mirror 314 so that the optical elements can be assembled into a compact package. With the exception of the curved mirror 314, all the elements of pancake window display system 310 are in the form of flat sheets, thereby imparting a relatively thin cross section. However, the curved mirror by its nature cannot be reduced to flat sheet form.

FIG. 19 shows a second prior art pancake window display system 350 which includes all of the elements 312–322 of pancake window display system 310 shown in FIG. 18 except for curved, spherical beam splitting mirror 314. Pancake window display system 350 of FIG. 19 employs a static, reflective type holographic analog 352 of a curved mirror in place of the conventional curved mirror 314 of FIG. 18. Typically, such analog 352 is formed by superimposing a coherent monochromatic "reference" beam of light and a coherent "object" beam of light upon a transparent photo sensitive layer to form an interference pattern within the photosensitive layer. The layer is then photographically developed to produce the holographic analog.

As shown in FIG. 19, pancake window display system 350 operates in a manner substantially similar to the pancake window display system 310 shown in FIG. 18. Advantageously, all elements of pancake window display 350 are reduced to a flat sheet form that reduces a longitudinal thickness and weight substantially. However, while pancake window display system 310 shown in FIG. 18 provides a broad band, or colored image to viewer 342, pancake window display system 350 shown in FIG. 19 can provide only a narrow band or monochromatic image to viewer 342 as a result of employing the static, reflective type holographic analog 352.

SUMMARY OF THE INVENTION

The present invention provides one or more dynamic, switchable holographic elements which can be used in a pancake window display system. Each of the one or more switchable holographic elements is configured to operate between active and inactive modes. In the active mode, the switchable holographic element substantially alters a substantial portion of light incident thereon. In one embodiment, the switchable holographic element operating in the active state, reflects and collimates a substantial portion of light incident thereon. In this embodiment, the switchable holographic element in the active state defines a holographic analog of a concave, spherical mirror. In the inactive state, the switchable holographic element transmits substantially all light incident thereon without substantial alteration. In one embodiment, the holographic analog of the concave, spherical mirror of the switchable holographic element is erased.

In another embodiment, the present invention provides three, dynamic, switchable holographic elements, each one of which operates between the active and inactive states in accordance with signals provided by a logic control circuit. Each of the three switchable holographic elements operating in the active state defines a holographic analog of a concave, spherical mirror which reflects and collimates a select bandwidth of light incident thereon. In the inactive state, each of the three switchable holographic elements erases its holographic analog of the concave spherical mirror so that substantially all light incident thereon is transmitted thereto substantially unaltered. In one embodiment when active, the first of the three holographic optical elements is configured to reflect and collimate narrow band red light, the second holographic optical element is configured to reflect and collimate narrow band blue light, and the third holographic optical elements is configured to reflect and collimate narrow band green light. In this embodiment, the control logic circuit, coupled to each of the three holographic optical elements, sequentially activates and deactivates the three optical elements one at a time so that the three switchable optical elements can reflect and collimate red, blue and green image light sequentially.

BRIEF DESCRIPTION OF THE DRAWINGS

Other objects and advantages of the invention will become apparent upon reading the following detailed description and upon reference to the accompanying drawings in which:

FIGS. 11a and 11b are representative side views of a slanted transmission grating (FIG. 11a) and a slanted reflection grating (FIG. 11b) showing the orientation of the grating vector G of the periodic planes of polymer channels and PDLC channels;

FIG. 12 is an elevational view of a reflection grating, made in accordance with the teachings of the description herein, when a shear stress field is applied thereto;

Figure 1:
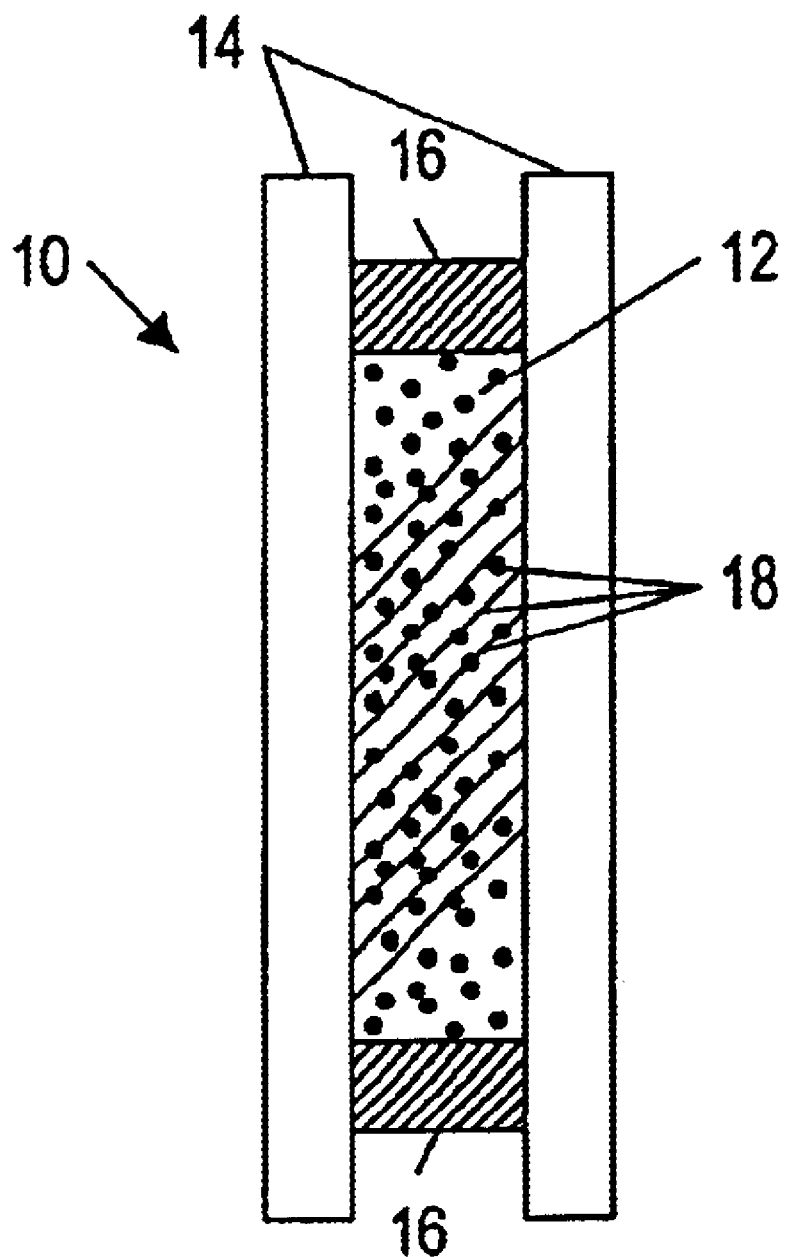
FIG. 1 is a cross-sectional view of an electrically switchable hologram made of an exposed polymer dispersed liquid crystal (PDLC) material made in accordance with the teachings of the description herein.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

1. Switchable Hologram Materials And Devices

The present invention employs optical elements formed, in one embodiment, from a polymer dispersed liquid crystal (PDLC) material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the optical elements may be formed in a single step. The optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. No. 08/273,436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

The process by which a hologram for use in one embodiment of the present invention, is formed is controlled primarily by the choice of components used to prepare the homogeneous starting mixture, and to a lesser extent by the intensity of the incident light pattern. One embodiment of polymer dispersed liquid crystal (PDLC) material employed in the present invention creates a switchable hologram in a single step. A feature of the one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, are produced in a single-stop process.

The resulting one embodiment of PDLC material has an anisotropic spacial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of the one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by the one embodiment of PDLC material.

The same is prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an Argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In the one embodiment, the prepolymer material comprises a mixture of a photopolymerizable monomer, a second phase material, a photoinitiator dye, a coinitiator, a chain extender (or cross-linker), and, optionally, a surfactant.

In the one embodiment, the two major components of the prepolymer mixture are the polymerizable monomer and the second phase material, which are preferably completely miscible. Highly functionalized monomers may be preferred because they form densely cross-linked networks which shrink to some extent and to end to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used in the present invention. In the one embodiment, it has been found that an approximately 1:4 mixture of tri-to penta-acrylate facilitates homogeneous mixing while providing a favorable mixture for forming 10–20 $\mu$m films on the optical plates.

The second phase material of choice for use in the practice of the present invention is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, α-methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally $15 \geqq 100$ $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in the present invention, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6 V/$\mu$m.

PDLC materials used in the present invention may also be formed using a liquid crystalline bifunctional acrylate as the monomer ("LC monomer"). The LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2 V/$\mu$m). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

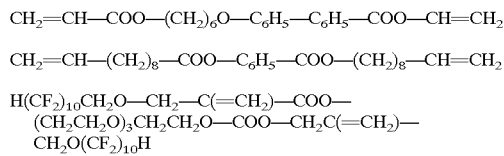

Semifluorinated polymers are known to show weaker anchoring properties and also significantly reduced switching fields. Thus, it is believed that semifluorinated acrylate monomers which are bifunctional and liquid crystalline may find suitable application in the present invention.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
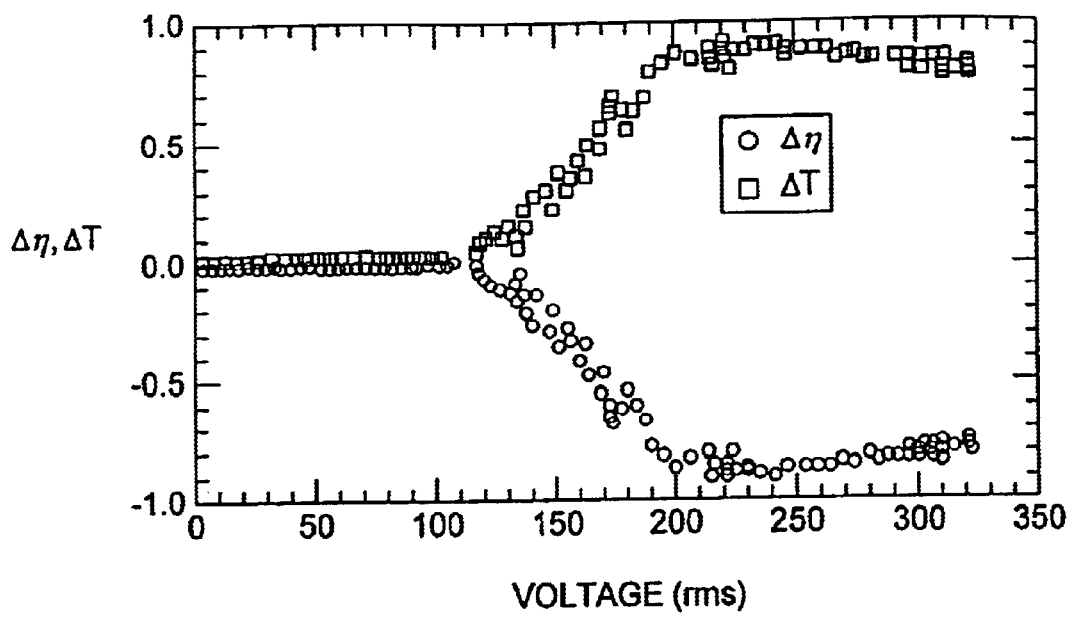
FIG. 2 is a graph of the normalized net transmittance and normalized net diffraction efficiency of a hologram made in accordance with the teachings of the description herein (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 mW/cm$^2$. The size of the liquid crystal domains is about 0.2 $\mu$m and the grating spacing is about 0.54 $\mu$m. This sample, which is approximately 20 $\mu$m thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
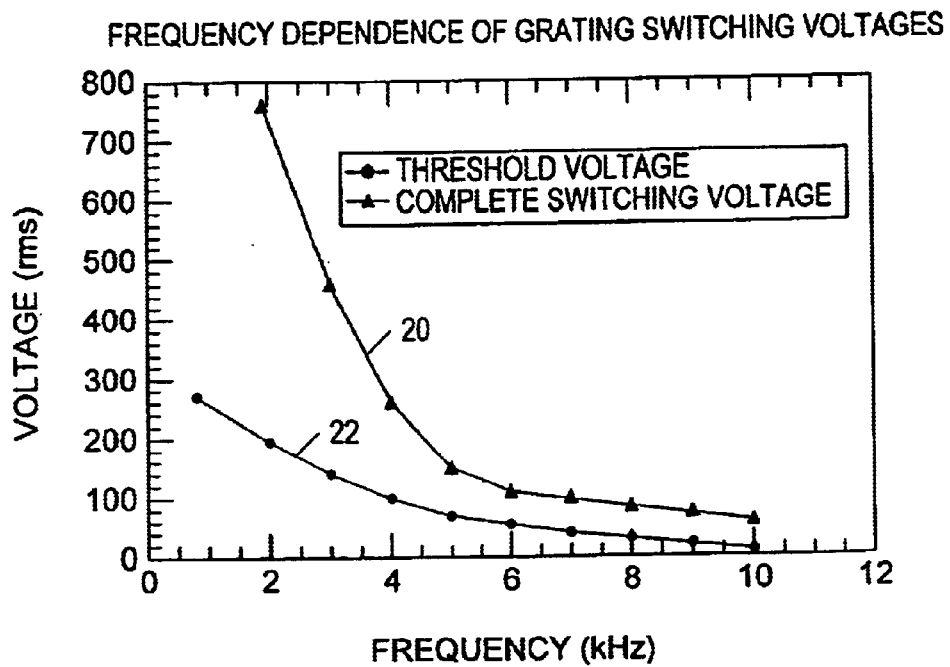
FIG. 3 is a graph of both the threshold and complete switching rms voltages needed for switching a hologram made in accordance with the teachings of the description herein to minimum diffraction efficiency versus the frequency of the rms voltage.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 4:
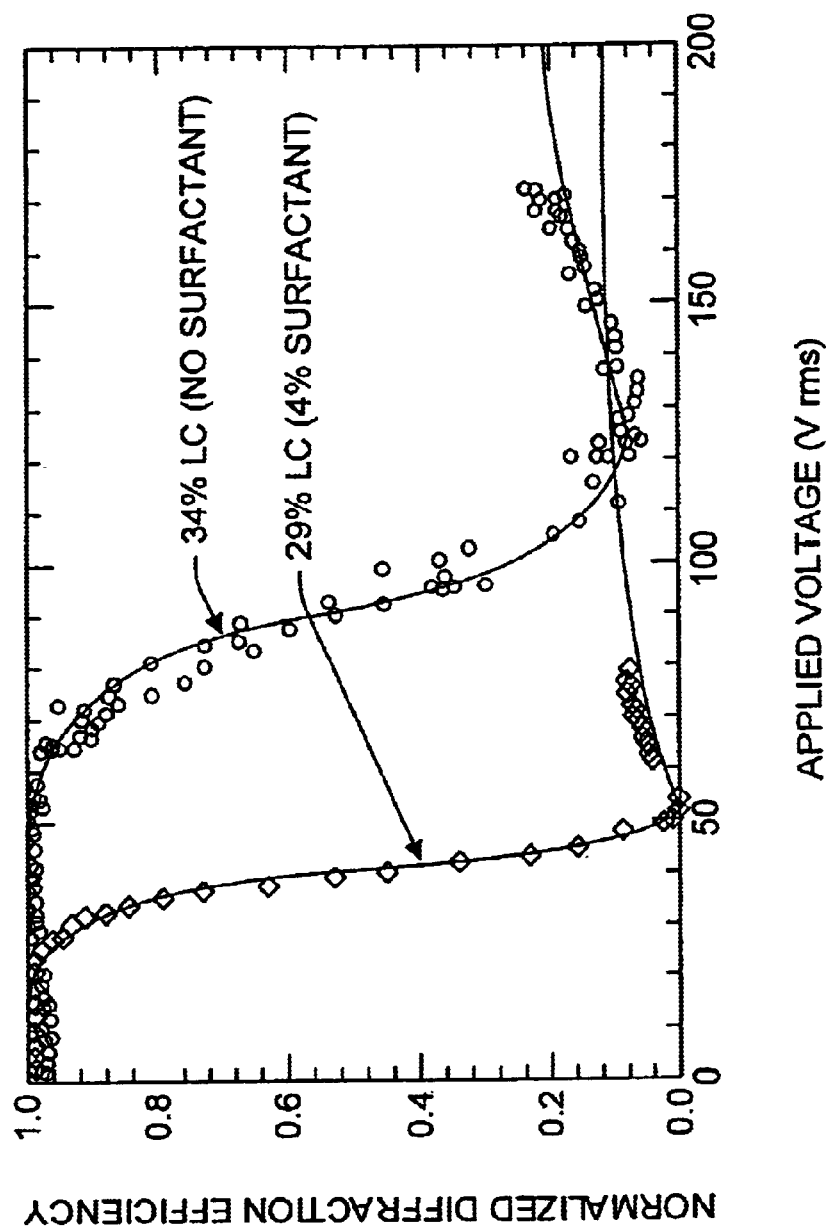
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.
Figure 5:
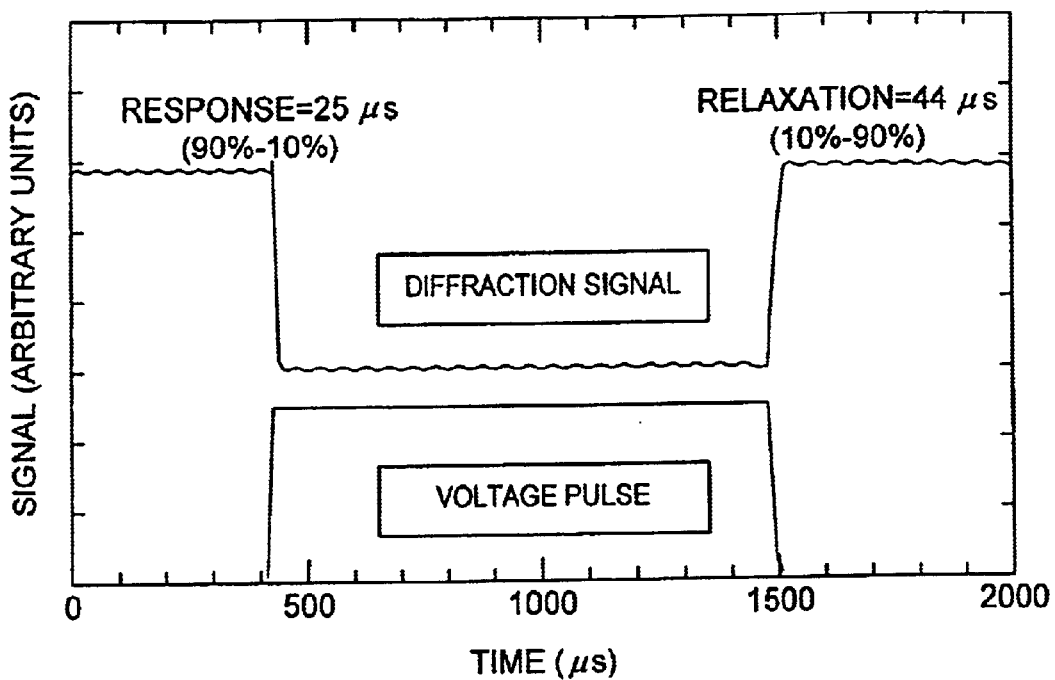
FIG. 5 is a graph showing the switching response time data for the diffracted beam in the surfactant-containing PDLC material in FIG. 4.
Figure 6:
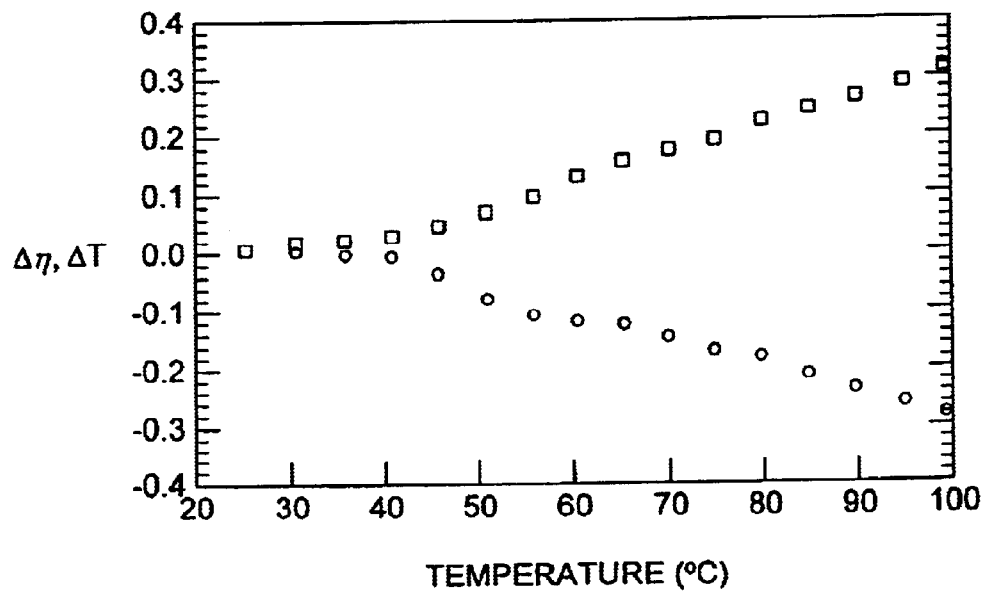
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size, reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
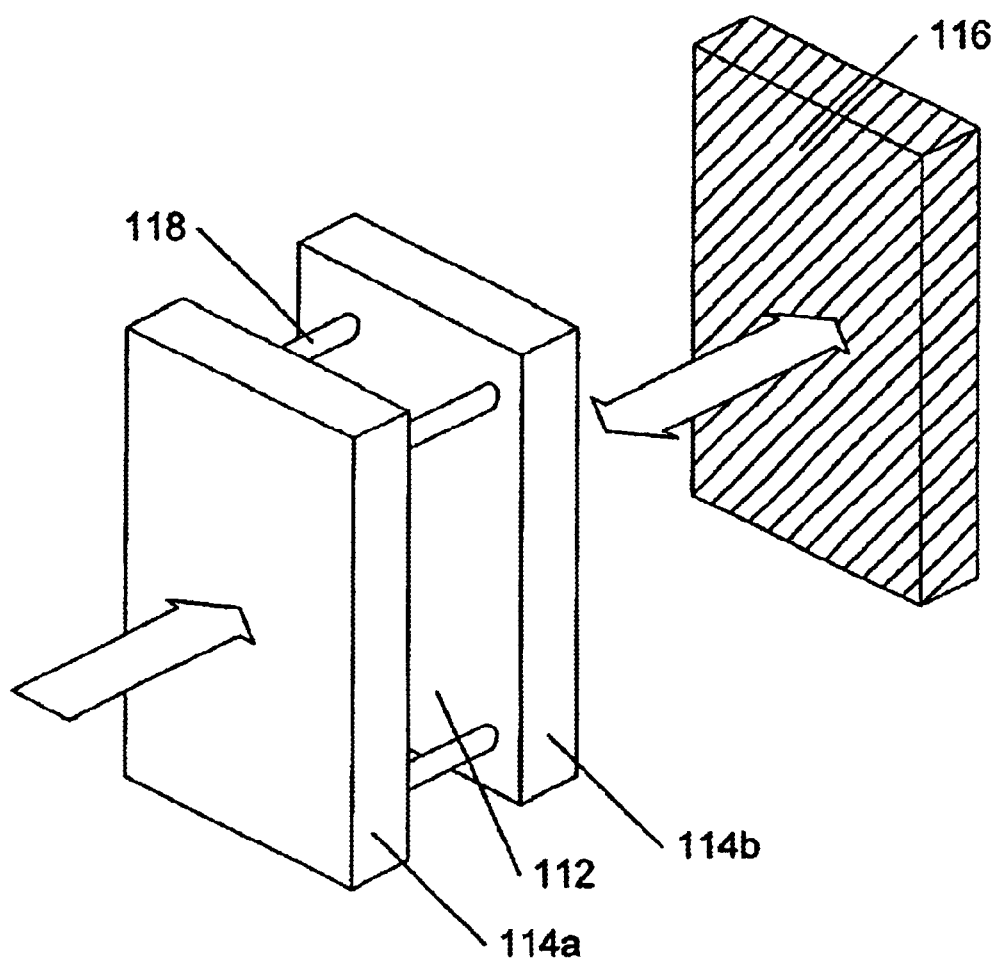
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 μm by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

Figure 8A:
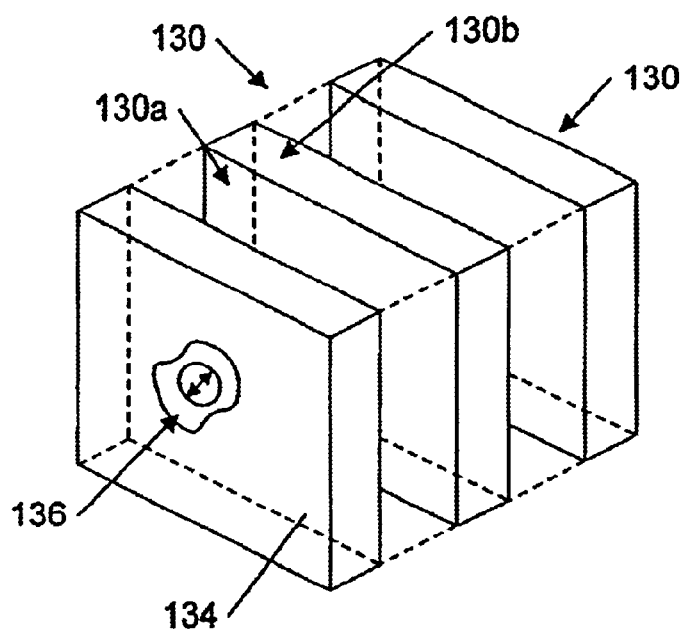
FIGS. 8a and 8b are elevational views of a reflection grating, made in accordance with the teachings of the description herein, having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, that the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8B:
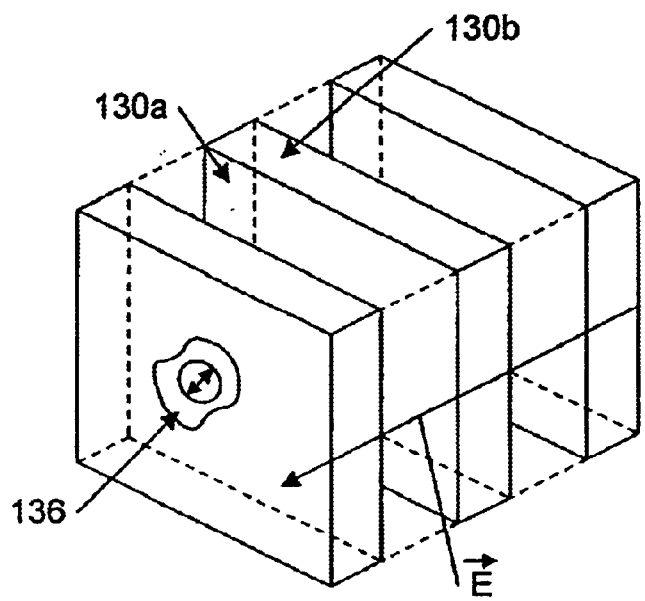

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In the one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9A:
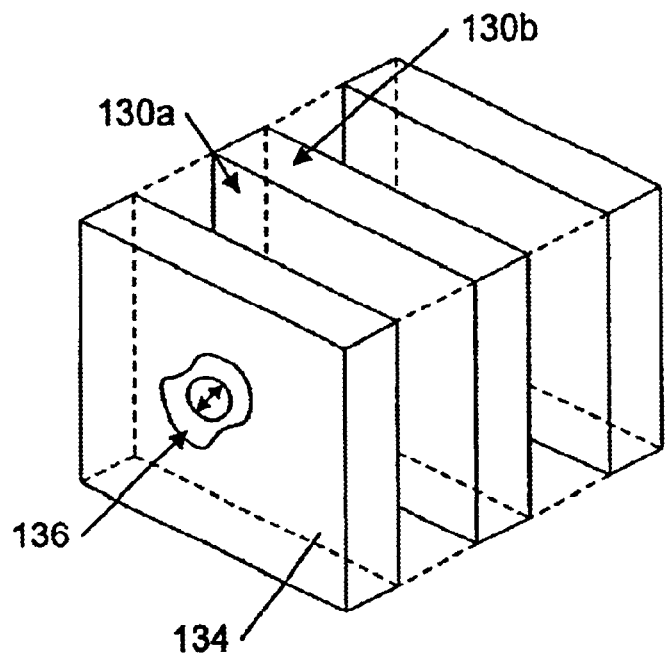
FIGS. 9a and 9b are elevational views of a reflection grating, made in accordance with the teachings of the description herein, having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9B:
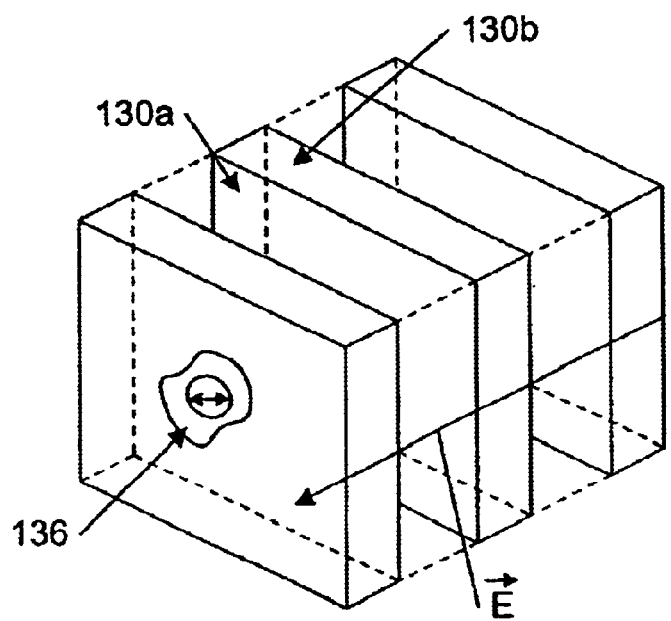

It is known that liquid crystals having a negative dielectric anisotropy ($\Delta\epsilon$) will rotate in a direction perpendicular to an applied field. As shown in FIG. 9a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystals and others are expected to find ready applications in the methods and devises of the present invention:

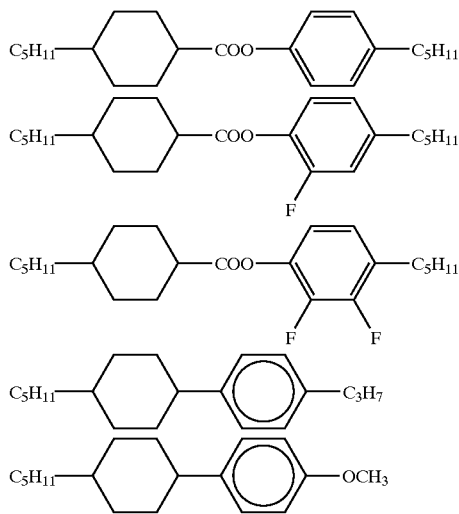

Liquid crystals can be found in nature (or synthesized) with either positive or negative $\Delta\epsilon$. Thus, it is possible to use a LC which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with LC composition, and typical values range from 1–10 kHz. Thus, by operating at the proper frequency, the reflection grating may be switched. It is expected that low cross-over frequency materials can be prepared from a combination of positive and negative dielectric anisotropy liquid crystals. A suitable positive dielectric liquid crystal for use in such a combination contains four ring esters as shown below:

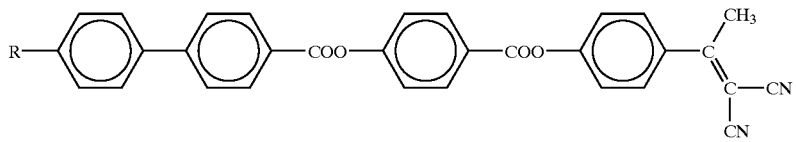

A strongly negative dielectric liquid crystal suitable for use in such a combination is made up of pyridazines as shown below:

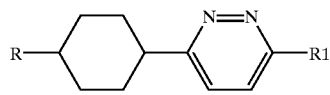

Both liquid crystal materials are available from LaRoche & Co., Switzerland. By varying the proportion of the positive and negative liquid crystals in the combination, cross-over frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

Figure 10A:
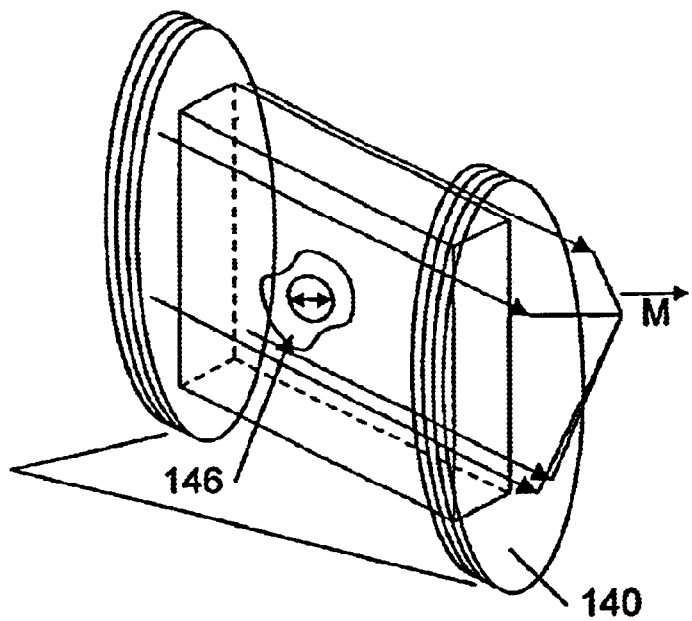
FIG. 10a is an elevational view of a reflection grating, made in accordance with the teachings of the description herein, disposed within a magnetic field generated by Helmholtz coils.
Figure 10B:
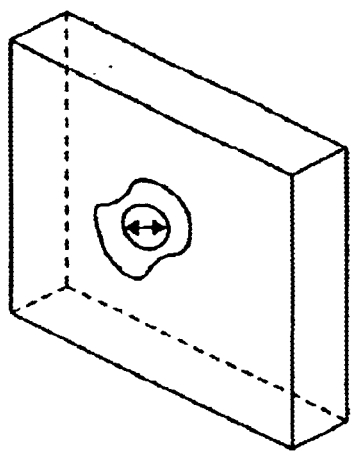
FIGS. 10b and 10c are elevational views of the reflection grating of FIG. 10a in the absence of an electric field (FIG. 10b) and with an electric field applied (FIG. 10c)
Figure 10C:
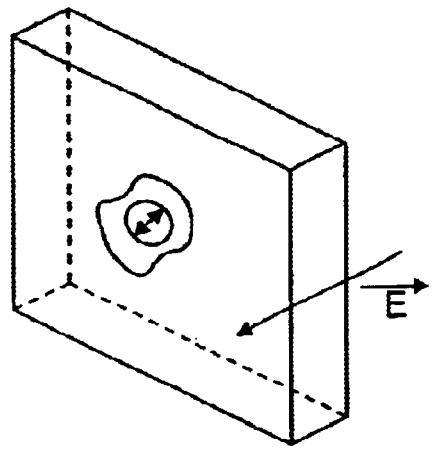

In still more detailed aspects, switchable reflection gratings can be formed using positive $\Delta\epsilon$ liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\epsilon$ liquid crystal will reorient in the direction of the field, which is perpendicular to the front surface of grating and to the periodic channels of the grating.

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
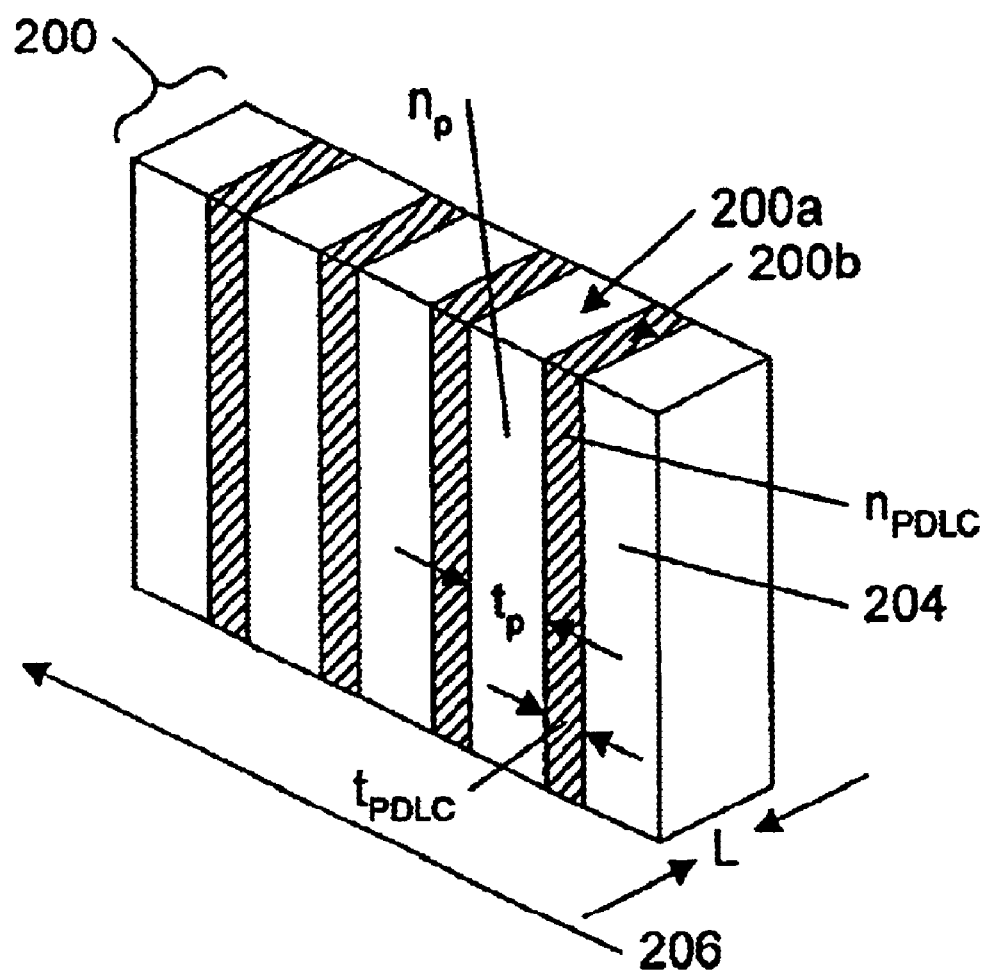
FIG. 13 is an elevational view of a subwavelength grating, made in accordance with the teachings of the description herein, having periodic planes of polymer channels and PDLC channels disposed perpendicular to the front surface of the grating.

In another embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=$\lambda/2$, and to form a quarter-wave plate, the retardance must be equal to one-quarter of a wavelength, i.e. retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_o|L$$

Thus, for a half-wave plate, i.e. a retardation equal to one-half of a wavelength, the length of the subwavelength grating should be selected so that:

$$L=\lambda/(2|\Delta n|)$$

Similarly, for a quarter-wave plate, i.e. a retardance equal to one-quarter of a wavelength, the length of the subwavelength grating should be selected so that:

$$L=\lambda/(4|\Delta n|)$$

Figure 14A:
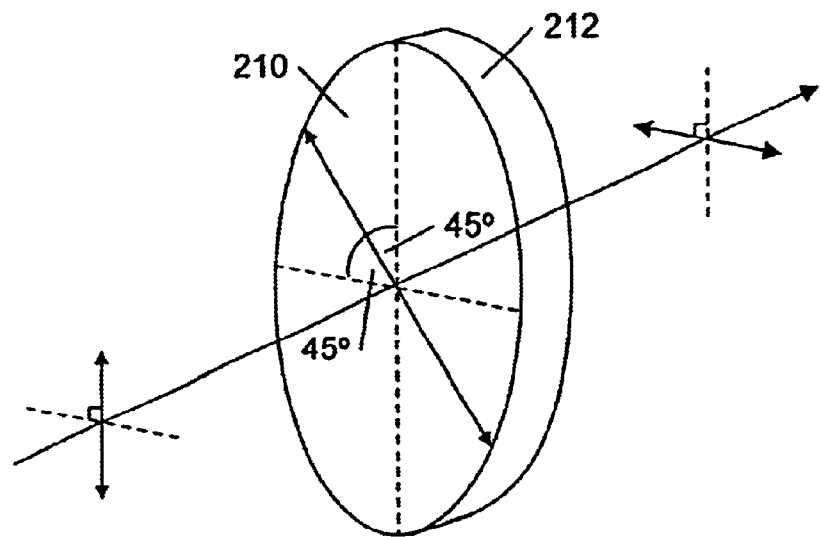
FIG. 14a is an elevational view of a switchable subwavelength, made in accordance with the teachings of the description herein, wherein the subwavelength grating functions as a half wave plate whereby the polarization of the incident radiation is rotated by 90°.
Figure 14B:
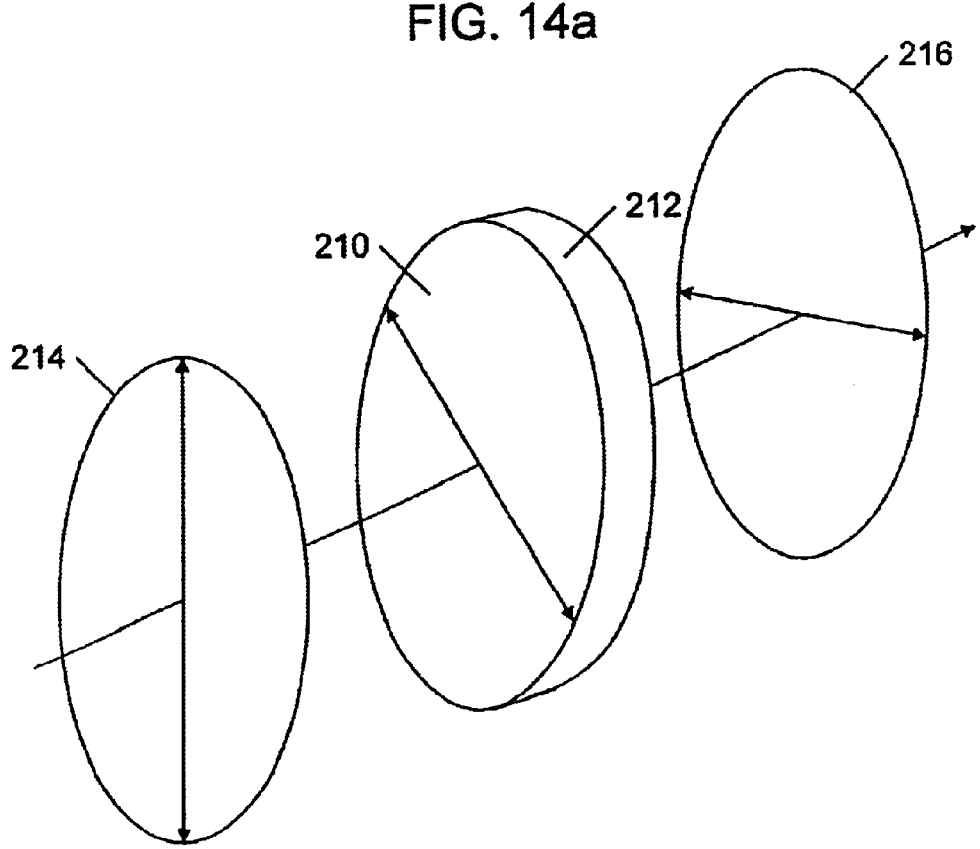
FIG. 14b is an elevational view of the switchable half wave plate shown in FIG. 14a disposed between crossed polarizers whereby the incident light is transmitted.
Figure 14C:
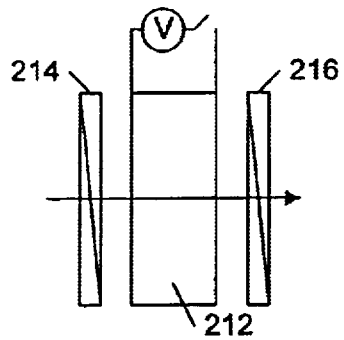
FIGS. 14c and 14d are side views of the switchable half wave plate and crossed polarizes shown in FIG. 14b and showing the effect of the application of a voltage to the plate whereby the polarization of the light is no longer rotated and thus blocked by the second polarizer.
Figure 14D:
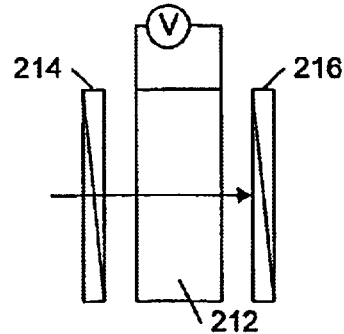

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
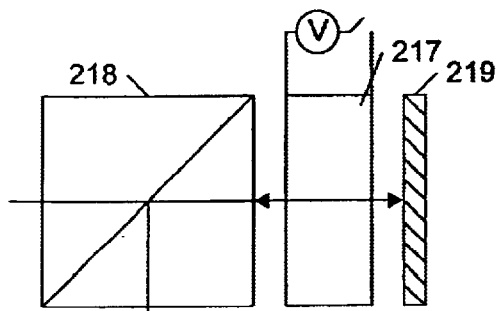
FIG. 15a is a side view of a switchable subwavelength grating, made in accordance with the teachings of the description herein, wherein the subwavelength grating functions as a quarter wave plate whereby plane polarized light is transmitted through the subwavelength grating, retroreflected by a mirror and reflected by the beam splitter.
Figure 15B:
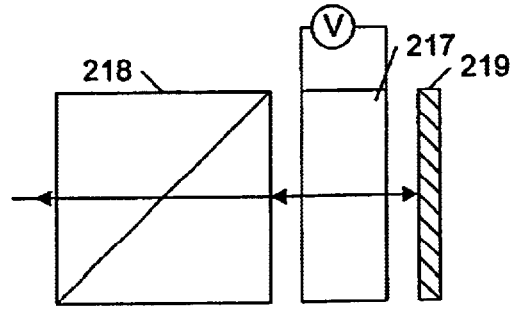
FIG. 15b is a side view of the switchable subwavelength grating of FIG. 15a and showing the effect of the application of a voltage to the plate whereby the polarization of the light is no longer modified, thereby permitting the reflected light to pass through the beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
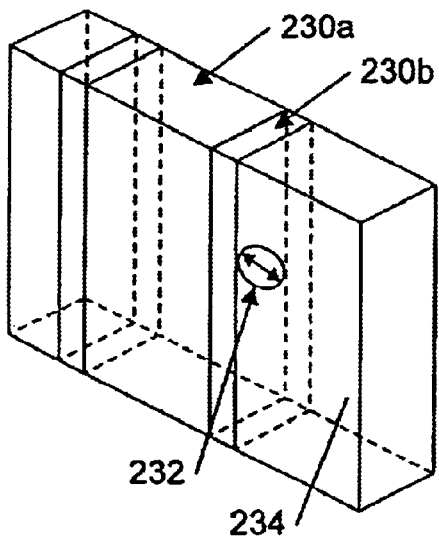
FIGS. 16a and 16b are elevational views of a transmission grating, made in accordance with the teachings of the description herein, having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
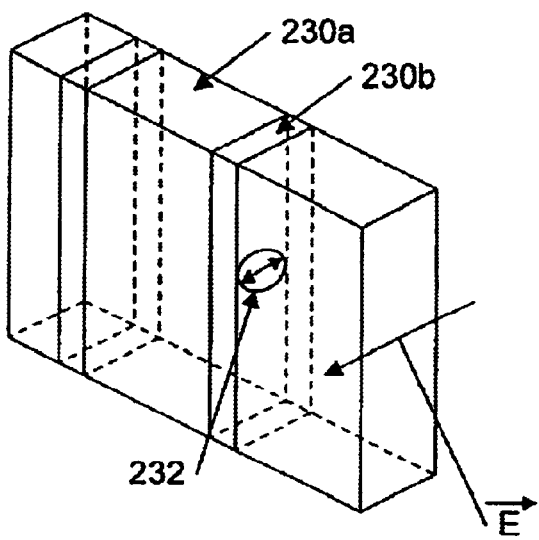

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5$^{th}$ Ed., New York (1975) and incorporated herein by reference, the birefringence of a subwavelength grating is given by the following relation:

$$n_e^2 - n_o^2 = -[(f_{PDLC})(f_p)(n_{PDLC}^2 - n_p^2)]/[f_{PDLC} n_{PDLC}^2 + f_p n_p^2]$$

Where $n_o$=the ordinary index of refraction of the subwavelength grating;

$n_e$=the extraordinary index of refraction;

$n_{PDLC}$=the refractive index of the PDLC plane;

$n_p$=the refractive index of the polymer plane $n_{LC}$=the effective refractive index of the liquid crystal seen by an incident optical wave;

$f_{PDLC} = t_{PDLC}/(t_{PDLC} + t_P)$ $f_P = t_P/(t_{PDLC} + t_P)$

Thus, the net birefringence of the subwavelength grating will be zero if $n_{PDLC} = n_P$.

It is known that the effective refractive index of the liquid crystal, $n_{LC}$, is a function of the applied electric field, having a maximum when the field is zero and value equal to that of the polymer, $n_P$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC} = n_P$. Therefore, if the refractive index of the PDLC plane can be matched to the refractive index of the polymer plane, i.e. $n_{PDLC} = n_P$, by the application of an electric field, the birefringence of the subwavelength grating can be switched off.

The following equation for net birefringence, i.e. $|\Delta n| = |n_e - n_o|$, follows from the equation given in Born and Wolf (reproduced above):

$$\Delta n = -[(f_{PDLC})(f_p)(n_{PDLC}^2 - n_p^2)]/[2n_{AVG}(f_{PDLC} n_{PDLC}^2 + f_p n_p^2)].$$

where $n_{AVG} = (n_e + n_o)/2$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC} = n_P + f_{LC}[n_{LC} - n_P]$$

Where $f_{LC}$ is the volume fraction of liquid crystal dispersed in the polymer within the PDLC plane, $f_{LC} = [V_{LC}/(V_{LC} + V_P)]$.

By way of example, a typical value for the effective refractive index for the liquid crystal in the absence of an electric field is $n_{LC} = 1.7$, and for the polymer layer $n_P = 1.5$. For the grating where the thickness of the PDLC planes and the polymer planes are equal (i.e. $t_{PDLC} = t_P$, $f_{PDLC} = 0.5 = f_P$) and $f_{LC} = 0.35$, the net birefringence, $\Delta n$, of the subwavelength grating is approximately 0.008. Thus, where the incident light has a wavelength of 0.8 µm, the length of the subwavelength grating should be 50 µm for a half-wave plate and a 25 µm for a quarter-wave plate. Furthermore, by application of an electric field of approximately 5 V/µm, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
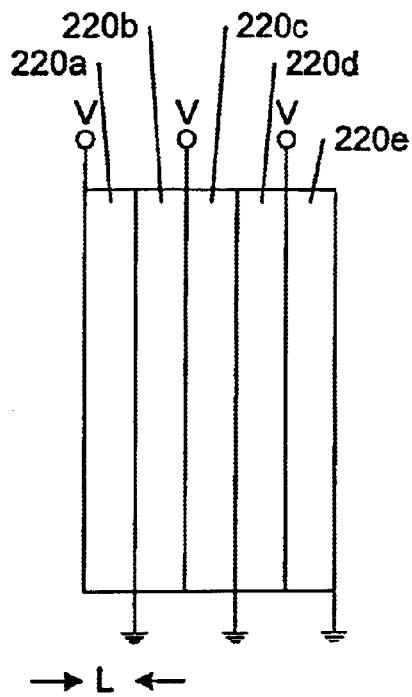
FIG. 17 is a side view of five subwavelength gratings wherein the gratings are stacked and connected electrically in parallel thereby reducing the switching voltage of the subwavelength grating.
Figure 18:
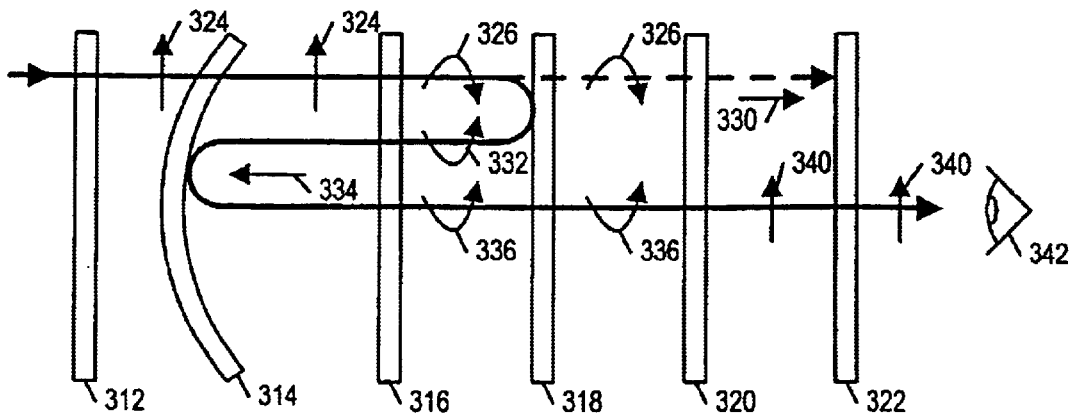
FIG. 18 is a block diagram of a prior art pancake window and display system.
Figure 19:
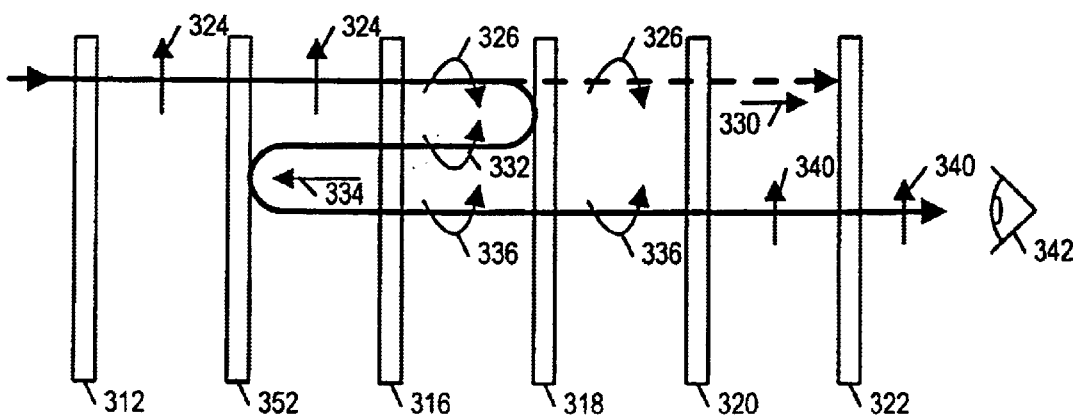
FIG. 19 is a block diagram of a prior art pancake window display system employing a static holographic element.

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 µm yields the thickness required for a half-wave plate. It should be noted that the length of the sample is somewhat greater than 50 µm, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

A switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this discription, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n \sim 0.5$) because the second phase domains are replaced with empty (air) voids ($n \sim 1$).

Similarly, in accordance with this description a high birefringence static sub-wavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

2. Pancake Window System

Figure 20:
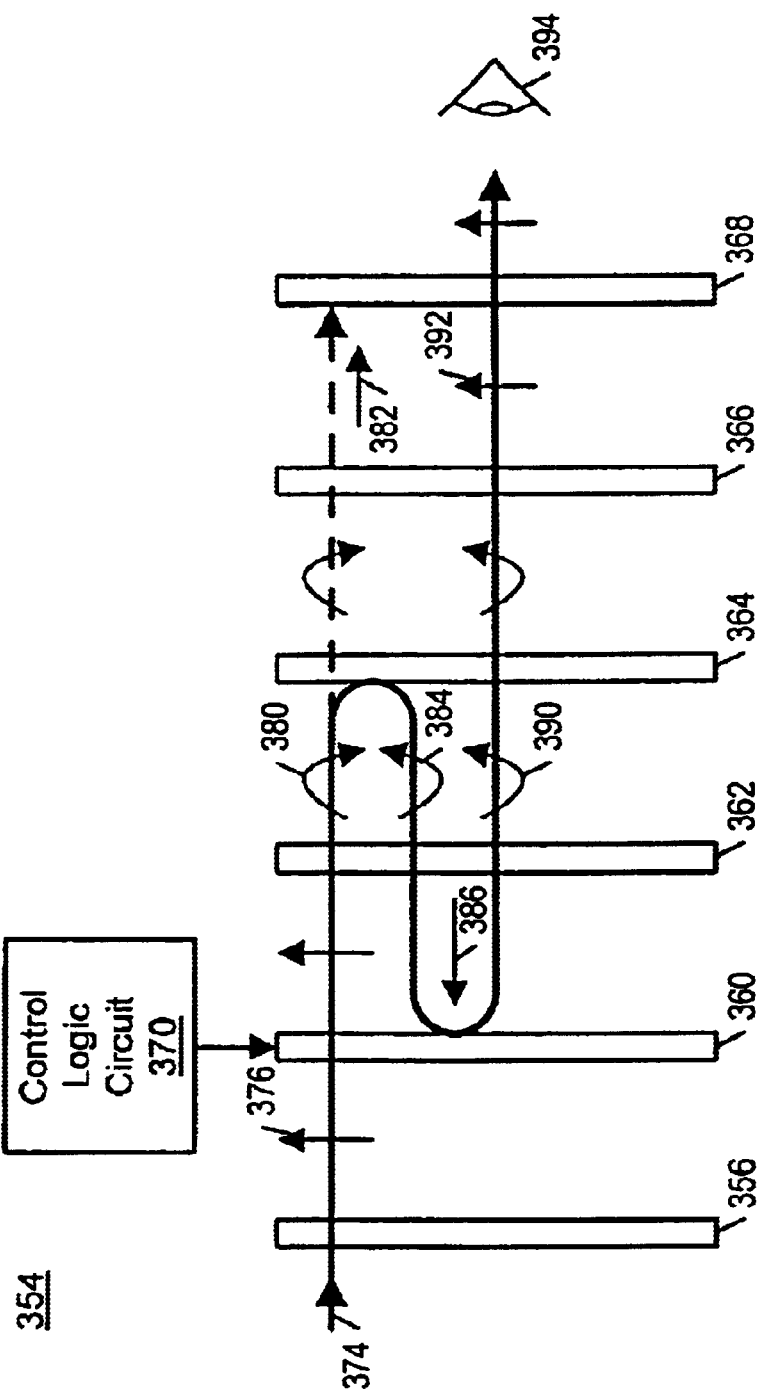
FIG. 20 is a block diagram of a pancake window display system employing the present invention.

FIG. 20 shows one embodiment of a pancake window display system 354 employing the present invention. Pancake window display includes a first linear polarizer 356, a switchable holographic optical system 360, a first quarter wave plate 362, a partially transmitting, partially reflecting beam splitting mirror 364, second quarter wave plate 366 and second linear polarizer 368. In FIG. 20, switchable holographic optical system 360 is coupled to control logic circuit 370. FIG. 20 shows a view of elements 356–368 exploded for ease of explanation. In practice, each element 356–368 may be defined in flat sheet form and stacked together to form a compact and lightweight system.

Control logic 370 may include conventional hardwired and/or software logic for carrying out the functions described below. For instance, control logic 370 may be embodied in an ASIC or a general-purpose processor that executes program instructions stored in conventional memory, e.g., ROM or RAM. Many combinations of standard hardware and software are possible to execute the functions described below. Assembling the hardware and/or software necessary to carry out the functions is a matter of routine to one skilled in the art given the teaching of this invention.

Optical system 360 in one embodiment employs one or more switchable holographic optical elements. Each optical element within system 360 may be coupled to control logic circuit 370. One or more of the remaining elements within pancake window display system 354 may likewise comprise a switchable holographic element coupled to control logic circuit 370. However, for ease of explanation, elements 356 and 362–368 are presumed to be conventional optical elements.

Each switchable holographic optical element in system 360 is switchable between active and inactive states in accordance with signals provided by control logic circuit 370. In the active state each switchable holographic optical element substantially alters a substantial portion of light incident thereon. In one embodiment, there is at least one switchable holographic optical element in system 360 which in the active state operates to reflect and collimate a substantial portion of light reflected off the beam splitting mirror 364. In one embodiment, the activated switchable holographic optical element defines a holographic analog of a curved, spherical beam splitting mirror. When deactivated by control logic circuit 370, the holographic analog of the spherical mirror is erased so that substantially all light incident upon the switchable holographic optical element is transmitted therethrough substantially unaltered. In general, each switchable holographic optical element within system 360 in the inactive state is configured to transmit substantially all light incident thereon without substantial alteration.

Figure 23C:
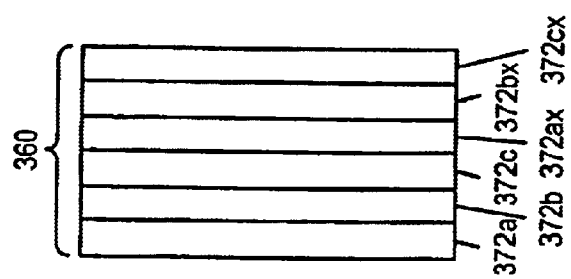
FIGS. 23*a*–23*c* are block diagrams of different embodiments of switchable optical systems employing the present invention.
Figure 23B:
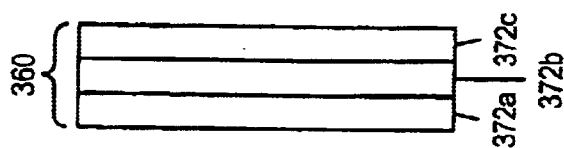
Figure 23A:
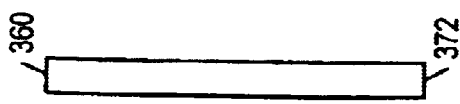

FIGS. 23a–23c show several different embodiments of the optical system 360 shown in FIG. 20. The system 360 shown in FIG. 20 should not be limited to that shown in FIGS. 23a–23c. In FIG. 23a, optical system 360 is defined by a single switchable holographic optical element 372 that operates between the active state and the inactive state. In the active state, switchable holographic optical element 372 operates to reflect and collimate a narrow band of light incident thereon. Additionally, a substantial portion of the remaining light incident upon switchable holographic optical element 372 operating in the active state is transmitted thereto substantially unaltered. In the active state, switchable holographic optical element 372 defines a holographic analog of a partially transmitting and partially reflecting curved, spherical beam splitting mirror. In the inactive state, this holographic analog of the beam splitting mirror is essentially erased so that substantially all light incident on switchable holographic optical element 372 is transmitted therethrough substantially unaltered.

FIG. 23b shows another embodiment of optical system 360 that can be employed in the pancake window display system 354 of FIG. 20. In this embodiment, optical system 360 includes three distinct switchable holographic optical elements 372a–372c. Each switchable holographic optical element 372a–372c shown in FIG. 23b is substantially similar to the switchable holographic optical element shown in FIG. 23a. However, in the active state each switchable holographic optical element 372a–372c reflects and collimates a distinct band of light incident thereon. In one embodiment, switchable holographic optical element 372a operating in the active state reflects and collimates narrow band red light, switchable holographic optical element 372b in the active state reflects and collimates narrow band blue light and switchable holographic optical element 372c in the active state reflects and collimates narrow band green light.

FIG. 23c shows yet another embodiment of the optical system 360 that can be employed in the pancake window display system 354 in FIG. 20. In this embodiment, optical system 360 includes six switchable holographic optical elements 372a–372c and 372ax–372cx. Switchable holographic optical elements 372a–372c in this embodiment are substantially similar to switchable holographic optical elements 372a–372c shown in FIG. 23b. Switchable holographic optical elements 372ax–372cx, however, are distinct. More particularly, each switchable holographic optical element 372ax–372cx may define in the active state a holographic analog of a conventional optical element which functions to, for example, deflect, focus, filter, etc., a narrow band of light incident thereon. In the active state, each switchable holographic optical element 372ax–372cx transmits substantially all light incident thereon without substantial alteration. In one embodiment, each switchable holographic optical element 372ax–372cx operates on the same narrow band of light corresponding to switchable holographic optical element 372a–372c, respectively. For example, switchable holographic optical element 372ax in the active state may define a holographic analog of a lens which focuses the same narrow band of red light which is reflected and collimated by switchable holographic optical element 372a operating in the active state. The holographic optical system of FIG. 23c is configured so that corresponding switchable holographic optical elements (e.g., 372a and 372ax) may be simultaneously activated such that optical system 360 can perform a wide range of different operations.

Returning to FIG. 20, operation of pancake window display 354 shown therein will now be explained with reference to optical system 360 comprising a single switchable optical element 372 such as shown in FIG. 23a. Broad band light 374 from an image source (not shown in FIG. 20) is linearly polarized by first linear polarizer 356. The direction of polarization of linear polarizer 356 is identified by vertical arrow 376, although any other direction can be employed. Linearly polarized light passes through activated switchable holographic optical element in optical system 360. First quarter wave plate 362, in one embodiment, has mutually perpendicularly fast and slow axes oriented at 45° to the direction of polarization 376 of first linear polarizer 356. Thus, first quarter wave plate 362 circularly polarizes light transmitted through the activated switchable optical element of optical system 360, either right or left, depending upon whether the angle between the direction of polarization and the F axis is 45° or −45°. It will be presumed that light emerging from first quarter wave plate 362 is right circularly polarized as shown by curved right arrow 380. Right circularly polarized light transmitted through first quarter wave plate 362 encounters partially transmitting and partially transmitting beam splitting mirror 364. A portion of the right circularly polarized light transmitted through mirror 364 goes on to second quarter wave plate 366 having, in one embodiment, fast and slow axes F' and S' parallel, respectively to the corresponding axes of first quarter wave plate 362. Second quarter wave plate 366 acts to change the right circularly polarized light transmitted through mirror 364 back to linearly polarized light having a direction of polarization oriented at 90° to the direction of polarization 376 of first linear polarizer 356. This is indicated in FIG. 20 by means of horizontal arrow 382. The linearly polarized light emitted from the second quarter wave plate 366 is blocked by second linear polarizer 368 whose direction of polarization is parallel to that of first linear polarizer 356.

A fraction of the right circularly polarized light from first quarter wave plate 362 which is reflected at beam splitting mirror 364 is converted by such reflection into circularly polarized light of the opposite rotation, i.e., into left circularly polarized light in the case assumed. This is indicated in FIG. 20 by the left curved arrow 384. In its reflected passage back toward optical system 360, this left circularly polarized light again encounters first quarter wave plate 362 which transforms it into linearly polarized light with a direction of polarization at 90° with respect to that of light polarized by first linear polarizer 356. This is represented by FIG. 20 by horizontal arrow 386. A narrow band of this linearly polarized light is then reflected by the activated switchable holographic optical element of system 360. A substantial portion of the remaining linearly polarized light is transmitted through optical system 360. The narrow band of light reflected by an optical system 360 becomes left circularly polarized in passage through the first quarter wave plate 362 as indicated by left curved arrow 390. A fraction of this light which is then transmitted through beam splitting mirror 364, is converted by second quarter wave plate 366 into linearly polarized light having a polarization direction parallel to the polarization direction of the first linear polarizer 356 as indicated by vertical arrow 392. This light accordingly is permitted to pass through second linear polarizer 368 and constitutes the fraction of the unpolarized broad band image light 374 which is visible to an observer 394.

The optical combination of linear polarizers 356 and 368 quarter wave plates 362 and 366, and plane beam splitting mirror 364 forms a virtual image of an image source that produces broad band image light 374 at or near the principle focus of the activated switchable holographic optical element of optical system 360. This virtual image is then imaged in turn at or closer than infinity by the activated switchable holographic optical element.

Although in FIG. 20 linear polarizers 356 and 368 have the directions of polarization parallel to each other and the quarter wave plates 362 and 366 have their fast and slow axes respectively parallel to each other, the present invention is not limited to this particular arrangement. If, however, linear polarizers 356 and 368 have their polarization directions perpendicular to each other and the quarter wave plates 362 and 366 have their respective corresponding axes crossed, the operation of pancake window display system 354 will be essentially the same.

In general, therefore, quarter wave plates 362 and 366 should both have their mutually perpendicular fast and slow axes oriented at substantially +45° and −45° to the direction of polarization of each of the linear polarizers 356 and 368. The two quarter wave plates 362 and 366 should have their corresponding axes oriented to each other at an angle which is a first substantially integral multiple of 90°, and the two polarizers 356 and 368 should have their directions of polarization oriented to each other at an angle which is a second substantially integral multiple of 90°, both of these multiples being even or both being odd.

Although the specific embodiment described in FIG. 20 makes use of a first linear polarizer 356 to linearly polarize the broad band image light 374 from the image source, it will be understood that such a polarizer will be unnecessary if the primary image source is already linearly polarized.

Figure 21A:
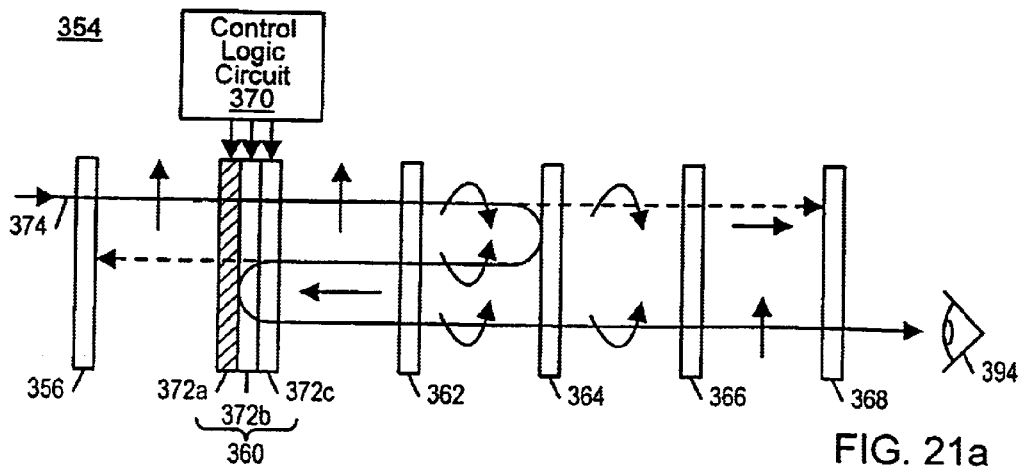
FIGS. 21*a*–21*c* are block diagrams illustrating operation of one embodiment of the pancake window display system shown in FIG. 20.
Figure 21B:
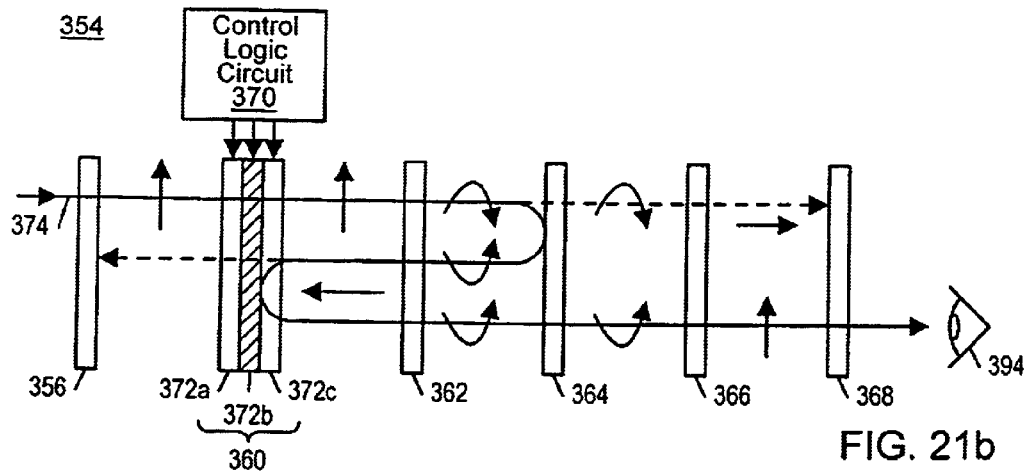
Figure 21C:
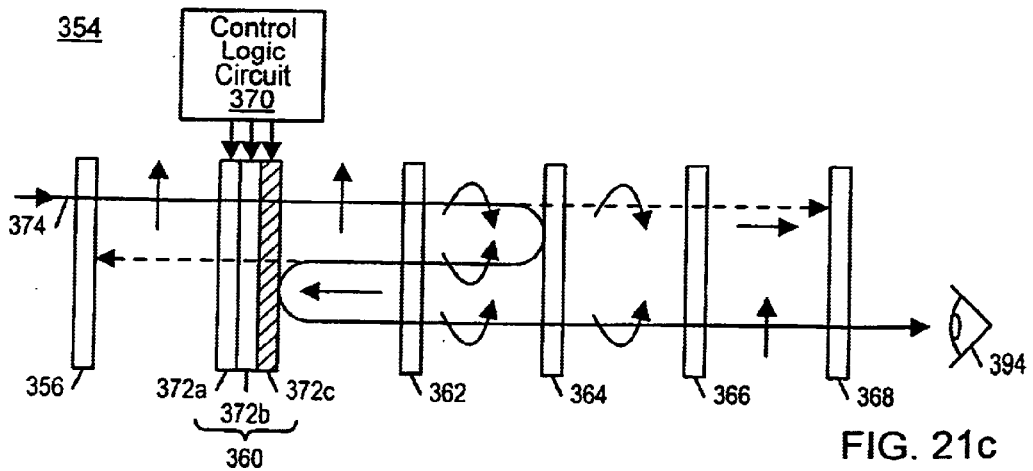

FIGS. 21a–21c illustrate operation of the pancake window display 354 shown in FIG. 20 with optical system 360 defined by the optical system shown in FIG. 23b. More particularly, optical system 360 in FIGS. 21a–21c is defined by switchable holographic optical elements 372a–372c. As shown in FIGS. 21a–21c, switchable holographic optical elements 372a–372c of system 360 are individually coupled to and controlled by control logic circuit 370.

In FIG. 21a, control logic circuit 370 activates switchable holographic optical element 372a and deactivates switchable holographic elements 372b and 372c. In this configuration, activated optical element 372a reflects and collimates narrow band red light reflected back from beam splitting mirror 364. A substantial portion of the remaining horizontally polarized light reflected back from beam splitting mirror 364, is transmitted through activated optical element 372a. It is noted again that deactivated optical elements 372b and 372c transmit substantially all light incident thereon without substantial alteration. Accordingly, observer 394 views narrow band red light of the broad band image light 374 provided to pancake window display system 354.

FIG. 21b shows pancake window display system 354 of FIG. 21a just after control logic circuit 370 deactivates optical element 372a and activates optical elements 372b. In this configuration, activated optical element 372b reflects and collimates narrow band horizontally polarized light reflected back from beam splitting mirror 364. Activated optical element 372b passes a substantial portion of the remaining horizontally polarized light reflected back from beam splitting mirror 364 without substantial alteration. Accordingly, observers 394 in this configuration views narrow band blue light of the broad band image light 374 provided to pancake window display system 354.

FIG. 21c represents the pancake window display system 354 shown in FIG. 21b just after control logic circuit 370 activates optical element 372c and deactivates optical element 372b. In this configuration, activated optical element 372c reflects and collimates narrow band green light reflected back from beam splitting mirror 364 while transmitting a substantial portion of the remaining horizontally polarized light reflected back from beam splitting mirror 364. Accordingly, observers 394 views narrow band green light of the broad band image light 374 provided to pancake window system display 354.

It is noted that optical systems employ static holographic optical elements that would use the wavelength selectivity of Bragg holograms to separate the three wavelength bands. However, this alternative optical system may suffer from optical cross talk—especially as the field of view of the display system in which the optical system is employed, is increased. In other words, light of one wavelength may travel in such a direction that it inadvertently satisfies the Bragg condition for one of the other holograms. In contrast, optical system 360 employing switchable optical elements does not suffer from optical cross talk even over large filed of views.

Control logic circuit 370 is configured to sequentially activate and deactivate optical elements 372a–372c as shown in FIGS. 21a–21c in a continuous cycle. If the cycle time is sufficiently short, the narrow band red light, blue light, and green light viewed by observer 394 in the cycle represented by FIGS. 21a–21c, respectively, is eye integrated so that observer 394 views a trichromatic version of the image light 374 provided to pancake window display system 354.

Figure 22:
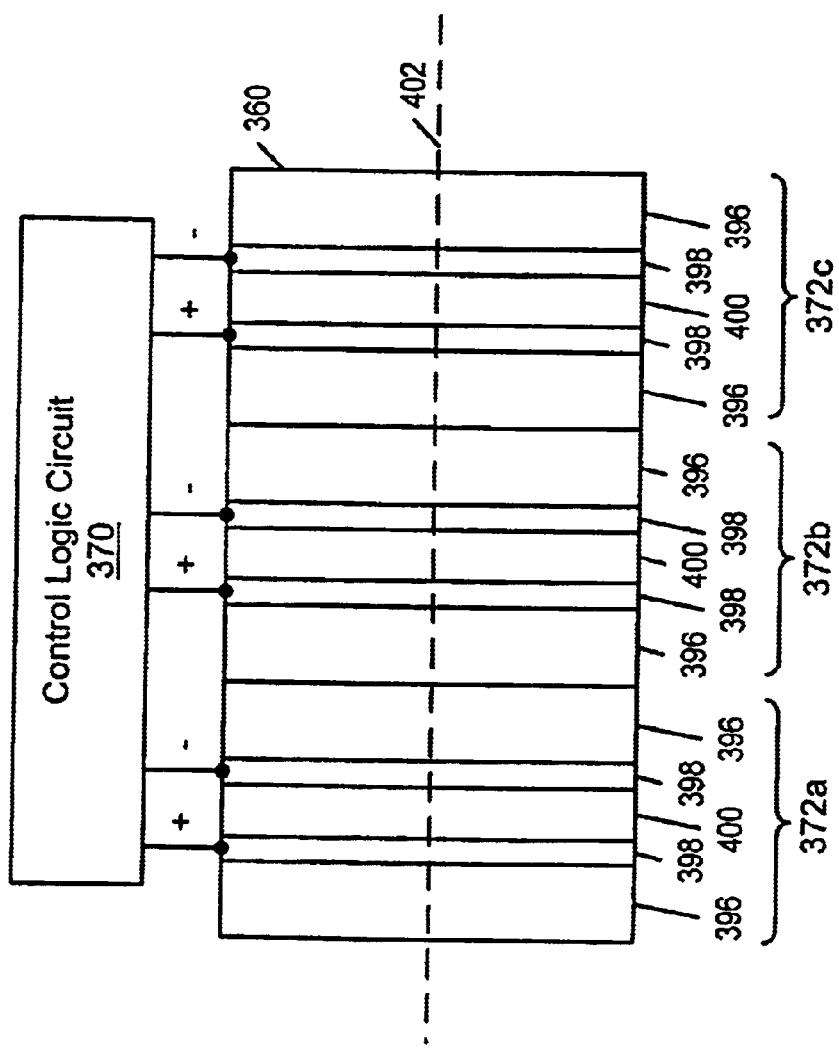
FIG. 22 is a schematic diagram of one embodiment of a switchable optical system employing the present invention.

FIG. 22 shows a cross-sectional view of one embodiment of the optical system 360 shown in FIGS. 21a–21c and 23b. In FIG. 22, each switchable holographic optical element 372a–372c includes a pair of substantially transparent and electrically nonconductive layers 396, a pair of substantially transparent and electrically conductive layers 398, and a switchable holographic layer 400 formed, in one embodiment, from the polymer dispersed liquid crystal material described above. In one embodiment, the substantially transparent, electrically nonconductive layers 396 comprise glass while the electrically conductive, substantially transparent layers 398 comprise indium tin oxide (ITO). Anti reflection coatings (not shown) may be applied to selected surfaces, including the substrates and the ITO, to improve the overall transmission efficiency of the display employing the pancake window and to reduce stray light. In this embodiment, all layers 396–400 are aligned like a stake of pancakes on a common axis 402.

Optionally, layers 396–400 of the optical system 360 shown in FIG. 21 may have substantially thin cross-sectional widths thereby providing a substantially thin aggregate in cross section. More particularly, switchable holographic layers 400 may have a cross-sectional width of 5–12 microns (the precise width depending on the spectral bandwidth and required diffraction efficiency) while glass layers 396 may have a cross-sectional width of 0.4–0.8 millimeters. Obviously, ITO layers 398 must be substantially transparent.

In one embodiment, ITO layers 398 are selectively coupled to a voltage source (not shown in FIG. 22) in accordance with control signals provided by control logic circuit 370. When ITO layers 398 of one of the optical elements 372a–372c are coupled to the voltage source, the corresponding optical element is said to operate in the inactive state. More particularly, when the ITO layers 398 of one of the optical elements 372a–372c are coupled to the voltage source, an electric field is established therebetween. This electric field, operates, in essence, to erase a holographic analog recorded in holographic layer 400 thereby transmitting substantially all light incident thereon without substantial alteration. When the ITO layers 398 of one of the optical elements 372a–372c are disconnected from the voltage source, the corresponding optical element is said to operate in the active state. More particularly, when ITO layers 398 of one of the optical elements 372a–372c are decoupled from the voltage source, no electric field is present therebetween and the holographic analog recorded in switchable holographic layer 400 reappears and substantially alters a substantial portion of light incident thereon. For example, with no electric field present between the ITO layers 398 in optical element 372a, the holographic analog of a curved mirror appears and operates to reflect and collimate narrow band red light incident upon optical element 372a.

Switchable holographic layers 400 record holographic analogs of conventional optical components such as a curved mirror. In one embodiment, the recorded holographic analogs are characterized by a high diffraction efficiency and a fast rate at which the optical element can be switched between active and inactive states. In the Polymer dispersed liquid crystal material embodiment of switchable holographic layer 400, the recorded holographic analogs can be switched from a diffracting state to a passive state with the creation and elimination of the electric field mentioned above. Ideally, the holographic analogs would need to be of the Bragg type in order to achieve high diffraction efficiency.

The holographic analog recorded in switchable holographic layers 400 can be based on PDLC materials. The holograms, in one embodiment, result in an interference pattern created by recording beams (i.e., a reference beam and an object beam) within layer 400. Interaction of the laser light with the PDLC material causes photopolymerization. Liquid crystal droplets become embedded in the region of the bright fringes which are formed by the intersection of the recording beams during the hologram recording process. When a voltage is applied to ITO layers 398 the liquid crystal droplets in layer 400 reorient and change the effective refractive index of layer 400 thereby essentially erasing the hologram recorded therein. The material used within layer 400 is configured to operate at a high switching rate (e.g., the material can be switched in tens of microseconds, which is very fast when compared with conventional liquid crystal display materials), and a high diffraction efficiency.

It is noted within FIG. 22 that optical system 360 includes substantially transparent, electrically nonconductive layers (e.g., glass) positioned adjacent to each other such that they are in substantial contact. However, optical system 360 shown in FIG. 22 may function as described above with one of these adjacent substantially transparent, electrically nonconductive layers removed therefrom.

It was noted above with reference to FIG. 23c that additional switchable holographic optical elements 372ax–372cx may be added to provide optical functions other than reflection and collimation provided by switchable optical elements 372a–372c. These additional optical elements 372ax–372cx may have the same cross-sectional configuration as the optical elements 372a–372c shown in FIG. 22. It was noted that, for example, optical elements 372ax–372cx may operate as a converging lens when active to enable selective variable modification (zoom). Additional optical elements 372 could be added to enable optical system 360 to perform more complex optical operations. For example, additional optical elements 372 could be added to enable generation of multiple tiled images from a single source of image light. In this configuration, differing optical elements 372 may map image light to different regions of the displayed field of view provided to observer 394. By using a image display with a sufficiently fast update rate, the overall resolution of the displayed image provided to the observer can be increased. By tracking the eye-gaze direction of the observer, the same image tiling principle may provide a basis for a moving area of interest display.

Additional optical elements 372 could be added to perform optical functions necessary for head tracking. For example, optical elements 372 for projecting infrared radiation (or other suitable visible band light) onto the feature to be tracked in addition to optical elements 372 for imaging the back scattered infrared onto some imaging sensor, could be added. The infrared radiation would not affect the holographic analogs recorded in optical elements 372a–372c since the infrared radiation would fall well outside the spectral bandwidths thereof. Further, additional optical elements 372 could be added which would allow the display provided to the observer 394 to be switched between real image forming and virtual image forming modes of operation. The input image display could be based on a wide range of different technologies. Currently, the technology that offers prospects for the maximum brightness and resolution in addition to the lowest manufacturing cost, is based on miniature reflective LCD (using either nematic or ferroelectric materials) on silicon back planes. Other solutions may include micromechanical arrays such as the digital light processor device manufactured by Texas Instruments or alternately on one of the emerging range of diffractive devices, of which the Grating Light Valve developed by Silicon Light Machines is a good example. The light source could be any of the high intensity white light sources currently used in projectors. In some applications, arrays of high intensity LEDs could also be used. As an alternative to the use of flat panel array technology, it would also be possible to use scanned laser beams.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. An apparatus comprising:

first and second linear polarizers;

first and second quarter wave plates positioned between the first and second linear polarizers;

a beam splitting mirror positioned between the first and second quarter wave plates, and;

a first optical element positioned between the first linear polarizer and the first quarter wave plate, the first optical element formed from polymer dispersed liquid crystal material, wherein the first optical element is configured to transmit substantially all light incident thereon without substantial alteration when the first optical element operates in an inactive state, and wherein the first optical element is configured to alter a substantial portion of a first bandwidth of light incident thereon when the first optical element operates in an active state;

a second optical element positioned between the first optical element and the first quarter wave plate, the second optical element formed from polymer dispersed liquid crystal material, wherein the second optical element is configured to transmit substantially all light incident thereon without substantial alteration when the second optical element operates in an inactive state, and wherein the second optical element is configured to alter light a substantial portion of a second bandwidth of light incident thereon when the second optical element operates in an active state, and;

a third optical element positioned between the first optical element and the first quarter wave plate, the third optical element formed from polymer dispersed liquid crystal material, wherein the third optical element is configured to transmit substantially all light incident thereon without substantial alteration when the third optical element operates in an inactive state, and wherein the third optical element is configured to alter a substantial portion of a third bandwidth of light incident thereon when the third optical element operates in an active state;

wherein the third optical element is positioned between the second optical element and the first quarter wave plate.

2. The apparatus of claim 1:

wherein the first optical element is configured to reflect the substantial portion of the first bandwidth of light incident thereon when the first optical element operates in the active state;

wherein the second optical element is configured to reflect the substantial portion of the second bandwidth of light incident thereon when the second optical element operates in the active state, and;

wherein the third optical element is configured to reflect the substantial portion of the third bandwidth of light incident thereon when the third optical element operates in the active state.

3. The apparatus of claim 1:

wherein the first optical element is configured to reflect and collimate the substantial portion of the first bandwidth of light incident thereon when the first optical element operates in the active state;

wherein the second optical element is configured to reflect and collimate the substantial portion of the second bandwidth of light incident thereon when the second optical element operates in the active state, and;

wherein the third optical element is configured to reflect and collimate the substantial portion of the third bandwidth of light incident thereon when the third optical element operates in the active state.

4. The apparatus of claim 1:

wherein the first optical element comprises a first switchable hologram;

wherein the second optical element comprises a second switchable hologram, and;

wherein the third optical element comprises a third switchable hologram.

5. The apparatus of claim 1:

wherein the first optical element comprises a first switchable hologram that encodes a curved mirror when the first optical element operates in the active state;

wherein the second optical element comprises a second switchable hologram that encodes a curved mirror when the second optical element operates in the active state, and;

wherein the third optical element comprises a third switchable hologram that encodes a curved mirror when the third optical element operates in the active state.

6. The apparatus of claim 1:

wherein the first optical element comprises a first switchable hologram that encodes a concave spherical mirror when the first optical element operates in the active state;

wherein the second optical element comprises a second switchable hologram that encodes a concave spherical mirror when the second optical element operates in the active state, and;

wherein the third optical element comprises a third switchable hologram that encodes a concave spherical mirror when the third optical element operates in the active state.

7. The apparatus of claim 1 wherein each of the first, second, and third optical elements comprises at least one layer of electrically conductive material positioned adjacent the respective photo-polymer and liquid elements.

8. The apparatus of claim 7 wherein each layer of electrically conductive material comprises indium tin oxide (ITO).

9. The apparatus of claim 7 wherein each layer of electrically conductive material is configured to be selectively coupled to a voltage source, wherein each optical element operates in the inactive state when its respective layer of electrically conductive material is coupled to the voltage source, and wherein each optical element operates in the active state when its respective layer of electrically conductive material is not coupled to the voltage source.

10. The apparatus of claim 7 wherein the polymer dispersed liquid crystal material of each optical element are contained between substantially parallel planes separated by a distance of 5–12 microns.

11. The apparatus of claim 7 wherein each optical element comprises a pair of layers of electrically non-conductive, transparent material, wherein the polymer dispersed liquid crystal material of each optical element are contained between the respective pair of layers of electrically non-conductive, transparent material.

12. The apparatus of claim 11 wherein each electrically non-conductive, transparent material comprises glass.

13. The apparatus of claim 12 wherein at least one layer of electrically non-conductive, transparent material has a cross sectional thickness of 0.3–0.5 millimeters.

14. The apparatus of claim 1 wherein each of the first, second, and third optical elements comprises a pair of layers of electrically conductive material, wherein the polymer dispersed liquid crystal material of each optical element is contained between the respective pair of layers of electrically conductive material.

15. The apparatus of claim 1 further comprising control logic in data communication with each of the optical elements, wherein the control logic is configured to selectively couple the optical elements to a voltage source.

* * * * *